United States Patent [19]
Dvorkis et al.

[11] Patent Number: 5,959,286
[45] Date of Patent: Sep. 28, 1999

[54] METHOD AND APPARATUS FOR RASTER SCANNING OF IMAGES

[75] Inventors: Paul Dvorkis; Jim Li, both of Stony Brook; Eugene Joseph, Port Jefferson Station, all of N.Y.

[73] Assignee: Symbol Technologies, Inc., Holtsville, N.Y.

[21] Appl. No.: 08/890,847

[22] Filed: Jul. 10, 1997

Related U.S. Application Data

[63] Continuation of application No. 08/735,123, Oct. 22, 1996, abandoned, which is a continuation of application No. 08/275,515, Jul. 15, 1994, abandoned, and a continuation-in-part of application No. 08/245,267, May 18, 1994.

[51] Int. Cl.$^6$ ...................................................... G01K 7/10
[52] U.S. Cl. ............................................................ 235/470
[58] Field of Search ..................................... 356/431, 444, 356/375, 398; 250/566, 559.29, 559.3, 559.44, 559.48, 559.49; 235/462, 467, 470, 462.33, 462.32

[56] References Cited

U.S. PATENT DOCUMENTS

| | | |
|---|---|---|
| 2,541,247 | 2/1951 | Herr . |
| 2,580,270 | 12/1951 | Badgley et al. . |
| 2,971,054 | 2/1961 | Holt, Jr. . |
| 3,173,000 | 3/1965 | Johnson et al. . |
| 3,641,564 | 2/1972 | Fassett et al. . |
| 3,774,014 | 11/1973 | Berler . |
| 4,021,664 | 5/1977 | Ormsby . |
| 4,034,341 | 7/1977 | Isono et al. . |
| 4,203,672 | 5/1980 | Smith ...................................... 356/432 |
| 4,387,297 | 6/1983 | Swartz et al. . |
| 4,409,470 | 10/1983 | Shepard et al. ......................... 235/472 |
| 4,422,065 | 12/1983 | Radomirov et al. . |
| 4,523,093 | 6/1985 | Neumann . |
| 4,660,981 | 4/1987 | Stridsberg ............................... 356/398 |
| 4,701,050 | 10/1987 | Oshida et al. . |
| 4,701,053 | 10/1987 | Ikenaga . |
| 4,727,399 | 2/1988 | Matsumoto . |
| 4,816,660 | 3/1989 | Swartz et al. ........................... 235/472 |
| 4,822,986 | 4/1989 | Guthmueller et al. . |
| 4,874,933 | 10/1989 | Sanner . |
| 4,896,026 | 1/1990 | Krichever et al. ...................... 235/472 |
| 4,924,078 | 5/1990 | Sant'Anselmo et al. . |
| 5,028,797 | 7/1991 | Abe et al. . |
| 5,052,044 | 9/1991 | Gaborski . |
| 5,100,237 | 3/1992 | Wittekoek et al. . |
| 5,138,140 | 8/1992 | Siemiatkowski et al. .............. 235/462 |
| 5,140,142 | 8/1992 | Atsushi .................................. 235/472 |
| 5,155,344 | 10/1992 | Fardeau et al. ........................ 235/467 |
| 5,243,655 | 9/1993 | Wang . |
| 5,288,983 | 2/1994 | Nakazawa .............................. 235/462 |
| 5,298,727 | 3/1994 | Spratte et al. . |

FOREIGN PATENT DOCUMENTS

| | | |
|---|---|---|
| 0 384 955 | 9/1990 | European Pat. Off. . |
| 0 385 478 | 9/1990 | European Pat. Off. . |

*Primary Examiner*—Richard A. Rosenberger
*Attorney, Agent, or Firm*—Fish & Richardson P.C.

[57] ABSTRACT

A scanner has a window in its housing through which the scanning beam emerges to impinge upon an indicia to be read. The beam scans in a raster fashion over the window, and as it does so it impinges upon beam position indicating means which locate the position of the beam with respect to the scanner in at least certain portions of the scan pattern. Specifically, the beam position indicating means determines the position of the beam in a direction perpendicular to the overall scanning direction. In a preferred embodiment, the beam position indicating means may comprise one or more CCD's which provide electrical output signals dependent upon the position of the beam when it impinges upon them. Alternatively, the beam position indicating means may comprise passive code means such as a stacked series of bar code symbols. The location of the beam when it scans across the symbol can be determined by the unique pattern of reflections.

33 Claims, 6 Drawing Sheets

METHOD AND APPARATUS FOR RASTER SCANNING OF IMAGES

CROSS REFERENCE TO RELATED APPLICATIONS

This is a continuation of application Ser. No. 08/735,123, now abandoned, filed Oct. 22, 1996, which is a continuation of Ser. No. 08/275,515, filed Jul. 15, 1994, now abandoned, and is a continuation-in-part of application Ser. No. 08/245,267, filed May 18, 1994.

BACKGROUND OF THE INVENTION

The invention generally relates to an apparatus for, and a method of, raster scanning of an image. In particular, it relates to the provision of timing, synchronisation and/or locating information during the electro-optical scanning of an indicia, in a direction perpendicular to the scanning direction. The invention is particularly although not exclusively useful in the type of raster scanning apparatus known as a laser camera.

Bar code scanners normally read bar code symbols by very rapidly and repeatedly scanning a light beam, for example from a laser source, across the symbol or bar code symbol structure to be deciphered. Reflected light from the light and dark areas of the bar code is received by the scanner, with the time delays between the resultant received pulses of light being used as the basis of a calculation to determine the spacial relationship between light and dark areas which are present in the bar code. Because of natural variations in the scanning speed (both between scans and within a single scan), and other unquantifiable variables such as movement of the scanner in the user's hand during the scanning process, some means of location and synchronisation is required to ensure that the received series of light pulses can reliably be converted into the proper spacial relationship. This locating and timing or synchronisation information is normally built into the bar code. This can be done in many ways, but one convenient possibility is to include a series of special locating, timing or synchronisation lines within the bar code symbol structure, spaced apart by a known distance. Receipt of signals from these lines enables the scanner to correct for any non-uniformities in the scanning speed.

Because of their need for locating and timing information, bar code scanners have not widely been used to decode indicia such as signatures which intrinsically contain no locating or timing information. The problem of scanning signatures has been addressed by U.S. Pat. No. 5,138,140, which is in common ownership with the present application. That patent teaches that one can reliably scan a signature with a bar code scanner, provided that the label on which the signature is written also carries a multi-row preamble identification code in front of the signature, and a corresponding postamble code after the signature. In practice, labels are pre-printed with preamble and postamble codes, and the signatory is asked to sign in the space between them. The codes and the signature are then scanned. The timing information provided by the preamble and postamble codes enables the reflected light pulses from the signature to be accurately converted into a digitized spacial reconstruction of the signature, held in computer memory.

Although effective to achieve its stated purpose, the teaching of the prior art does require the use of relatively expensive pre-printed labels. This not only adds to the cost, but limits the flexibility of the system since to be effectively scanned a signature has to be written precisely in the specified area between the preamble and postamble codes. Signatures of different sizes are not easily catered for, neither is it easy to generalize the system to allow the scanner to read many types of images, of different sizes and orientations.

A further particular difficulty arises when one is scanning an image or other indicia by means of a raster scanning pattern. If one takes the "X" direction to be the scanning direction, and the "Y" direction to be the perpendicular direction, it is found in practice that it is more difficult to calibrate the scan in the Y direction that it is in the X direction. The reason is that the scanning in the X direction is relatively rapid, and hence a large number of scans can be completed, thereby providing a substantial amount of feedback information; movement in the Y direction, on the other hand, is slow and the amount of feed-back information is correspondingly limited. Knowledge of the instantaneous Y position of the scanning beam can be crucial in some circumstances, particularly when one is tying to scan an indicia such as a matrix code symbol or a stacked bar code symbol. It is impossible properly to decode such symbols unless one can be certain of which particular row is being read at any given instant. If Y positional information is not available, one may be reading a different part of the symbol from that which one is expecting. Furthermore, without Y positional information one cannot tell reliably whether the raster scanning pattern is skewed relatively to the symbol, so that a single scan line crosses several rows of the indicia.

SUMMARY OF THE INVENTION

It is an object of the present invention at least to alleviate the problems of the prior art.

It is another object to reliable capture non-synchronised indicia for subsequent retrieval for a wide variety of uses.

It is a further object to provide increased flexibility in the type, size, and orientation of indicia that can be captured.

It is a further object to provide improved timing/synchronisation/locating information in a direction perpendicular to a raster scan (e.g., in the Y direction).

In general, the invention features using an optical source to scan a light beam across an object in a two-dimensional scan pattern; using an optical detector to detect light reflected from the object and to produce a signal representative of reflectivity differences of the object along the path of the light beam; and positioning at least one beam detection sensor in the path of the outgoing light beam to provide an output indicative of the location of the beam along at least one of the two dimensions of the scan pattern.

The scanner may include a decoder supplied with the output of optical detector and the output of the beam position sensor. The object may include an indicia (e.g., a two dimensional bar code, a signature a logo).

With such an arrangement, one has both positional and timing information which enables one to calibrate the indicia being scanned in each of two perpendicular directions. In the preferred embodiment, the scanning means produces a raster scan pattern. The general direction of the scanning paths is herein referred to as the "X" direction, and the perpendicular direction as the "Y" direction. With such an arrangement, one obtains properly calibrated row information (in the Y direction) as well as column information (in the X direction). Rows and columns may of course be interchanged: they depend solely upon the scanning direction.

In one preferred embodiment, the beam position indicating means is positioned in the beam intermediate the scanning means and the indicia. Alternatively, a beam splitter may be used so that part of the beam from the scanning means goes to the indicia and another part goes to the beam position indicating means. If one knows or can calculate the position of that part of the beam which goes to the beam position indicating means, at least in some location, one can determine the exact location of that part of the beam which is directed towards the indicia.

The beam position indicating means may be part of the scanner, or may be included in a separate unit. Preferably, although not necessarily, the beam position indicating means are located within a housing of the scanner. They may in fact be part of the housing.

In any of the arrangements mentioned above, the beam position indicating means may be either active or passive. In the active version the beam position indicating means are light-sensitive and they produce an output signal which is dependent upon the position of the beam when it impinges upon the beam position indicating means. This output signal may be an analog or digital electrical signal, which is then used by the decoder to assist in the timing/calibration of the indicia which is to be decoded.

Alternatively, the beam position indicating means may be a passive position detector, such as stacked series of bar code symbols. Each of the stacked bar code signals may be unique, so that the position of the beam when it impinges upon the stack can be determined uniquely from the resultant sequence of light and dark reflections.

DETAILED DESCRIPTION OF THE PREFERRED EMBODIMENTS

Figure 1:
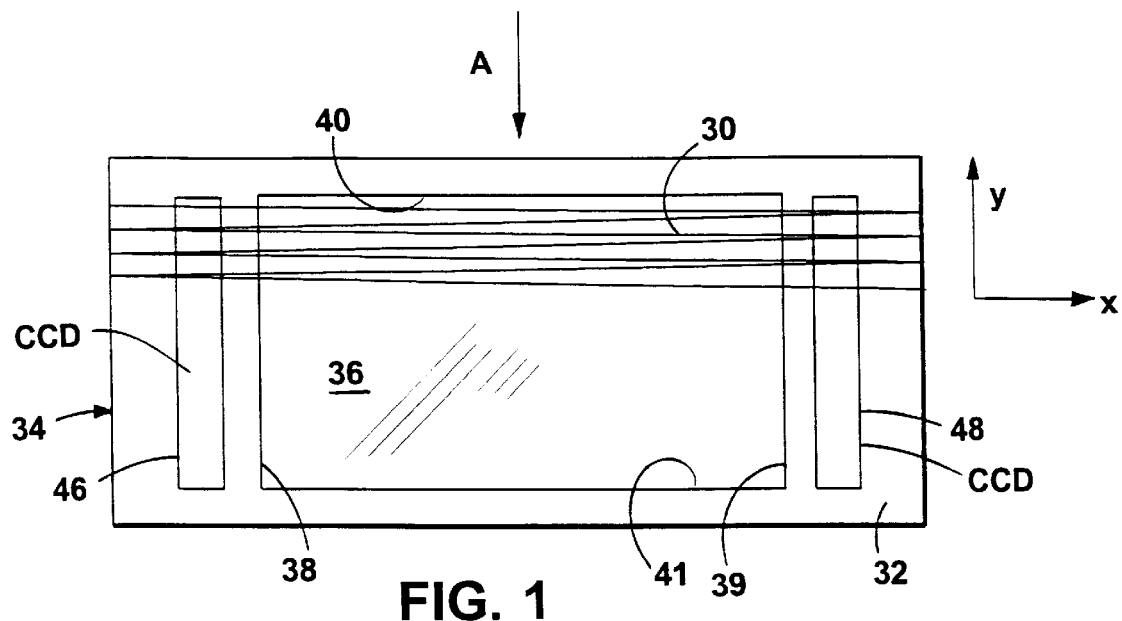
FIG. 1 is a diagrammatic drawing of the inside of a raster scanner, looking towards the window, according to a first embodiment of the present invention.
Figure 2:
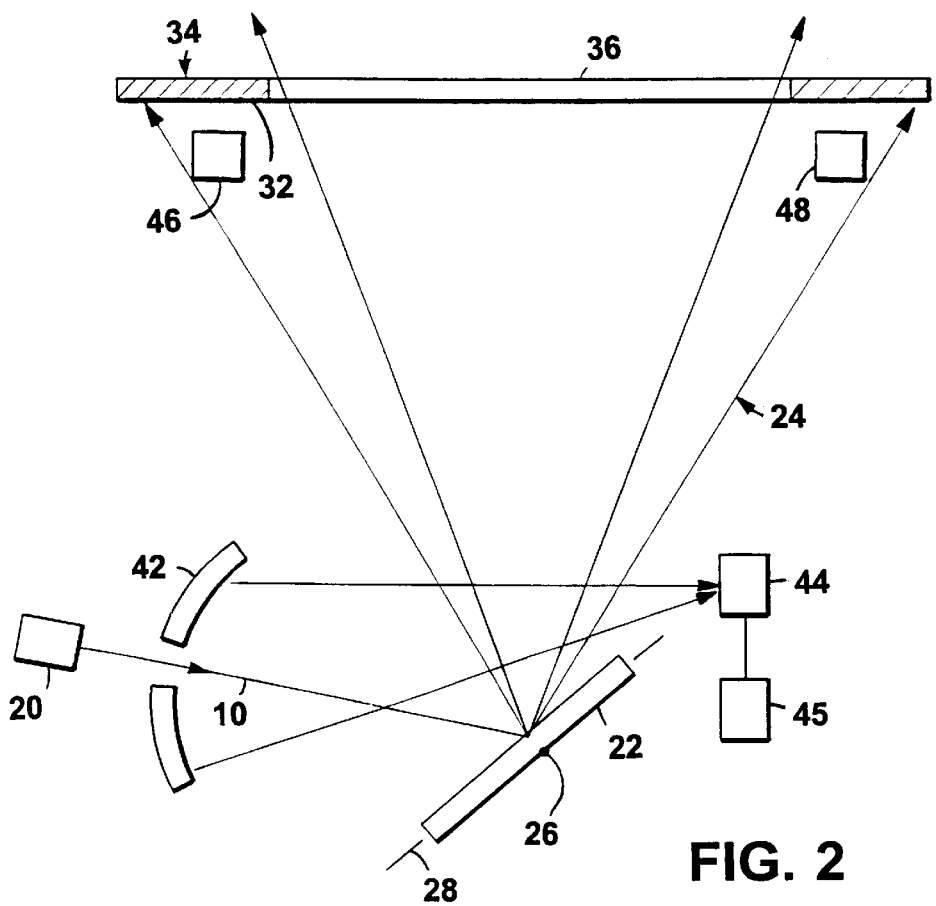
FIG. 2 is a further view of the raster scanner of FIG. 1, looking in the direction of the arrow A.
Figure 7:
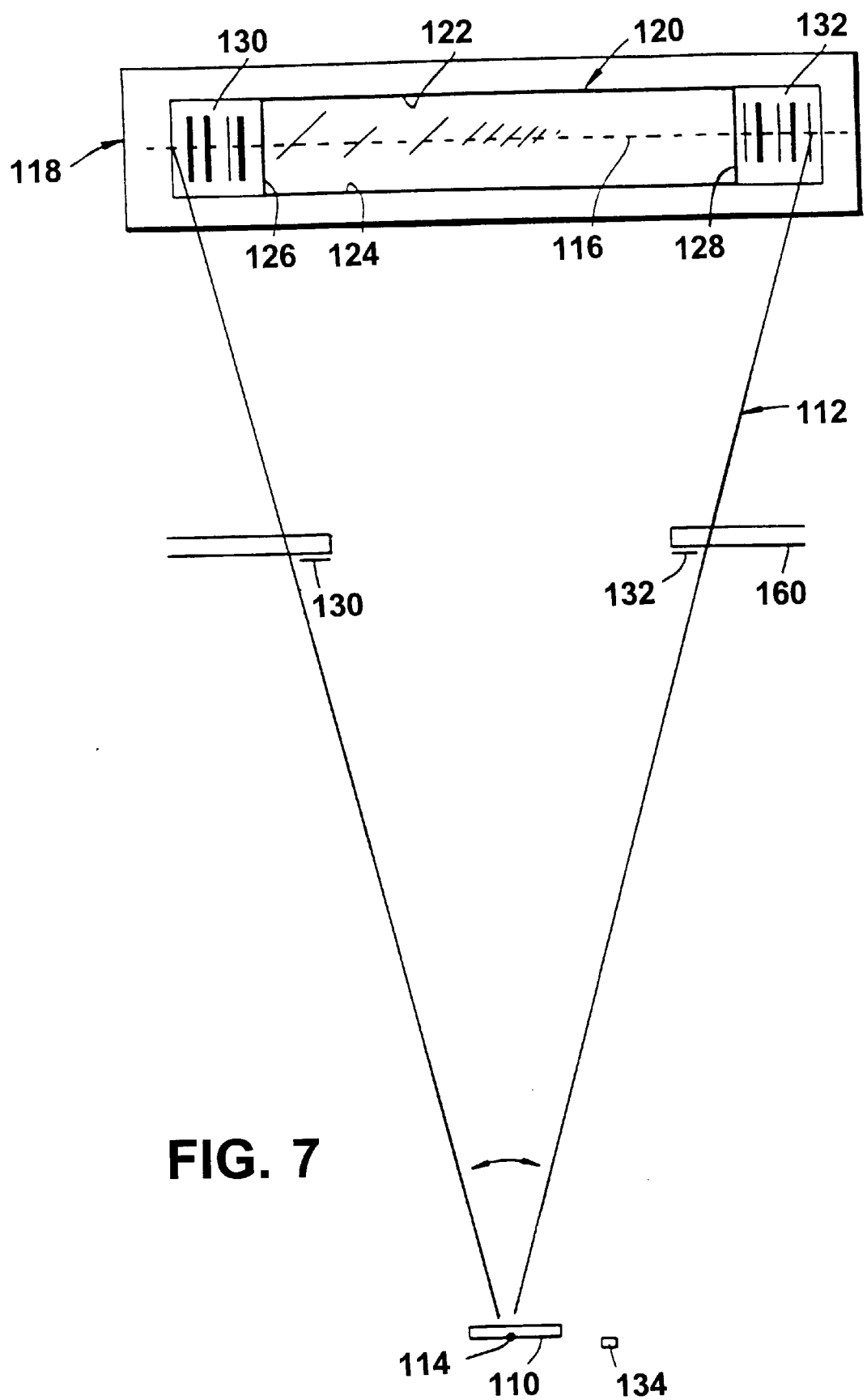
FIG. 7 is a schematic drawing of the inside of a bar code reader, according to an embodiment of the invention.

FIGS. 1 and 2 show diagrammatically the inside of a raster scanner according to a first embodiment of the present invention. FIG. 7 shows schematically the inside of a bar code reader according to another embodiment of the present invention. Only relevant features of the scanner are shown: the other features may be taken from any known prior art scanner such as are shown in U.S. Pat. Nos. 4,409,470, 4,816,660 and 4,896,026. The contents of these patents are incorporated herein by reference.

Figure 6:
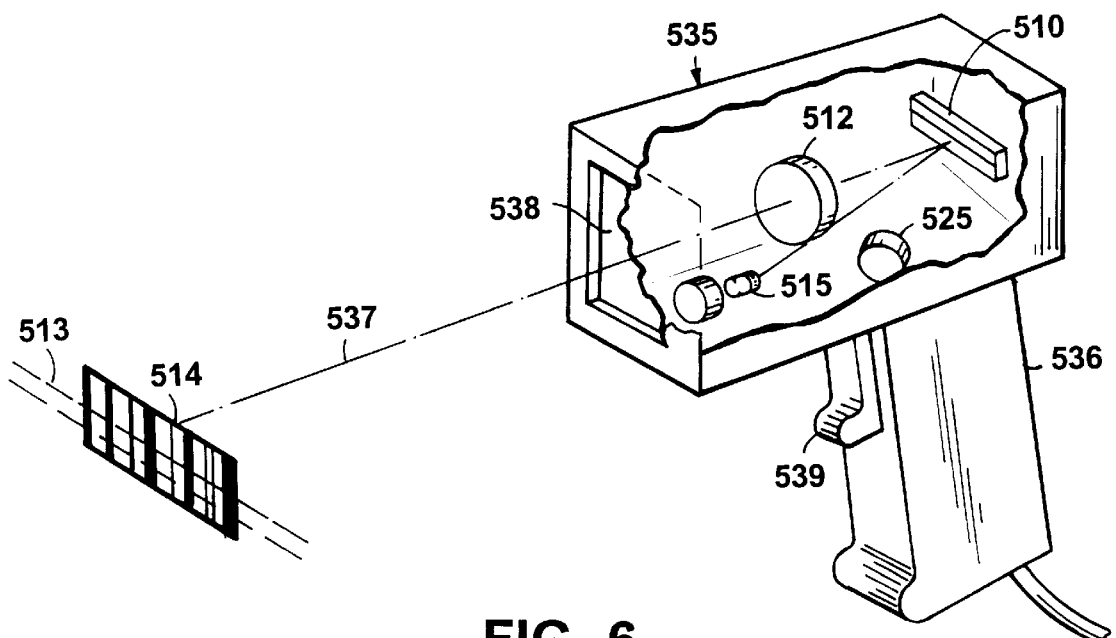
FIG. 6 shows an exemplary hand-held scanner into which the embodiments of the present invention may be incorporated.

FIG. 6 illustrates, as an example, a suitable type of hand-held laser scanner into which the present embodiment can be incorporated. The scanner comprises a main body 535 having a graspable handle portion 536 which carries a trigger 539. Within the body 535, there is a laser 515 which is arranged to shine onto an oscillating mirror 510. The resulting beam 537 passes through a lens 512, and out of the housing via a window 538. The mirror 510 is arranged to oscillate in such a way that the beam 537 traces out a raster scanning pattern 513 across an indicia 514 to be recorded. Light reflected back from the indicia passes through the window 538, through the lens 512 and is reflected back from the mirror 510 to a photodetector 525. The optical signal is then converted into an electrical signal, and the features of the indicia 514 determined.

In the embodiment of FIGS. 1 and 2, a light beam from a laser source 20 is reflected off of an oscillating mirror 22 to produce a scanning light beam generally indicated at 24. The mirror 22 oscillates about an axis 26, perpendicular with the page so that the light beam traces out a scan line which lies substantially in the plane of the paper in FIG. 2. At the same time, the mirror is gradually rotated about a further axis 28 so that the scanning light beam traces out a slightly different path at each scan. The resultant raster pattern 30 is shown in FIG. 1.

In this description, the X direction will be defined as the scanning direction, and the Y direction as the perpendicular direction (see FIG. 1).

The raster scan traces out a path on the inside surface 32 of a housing 34 of the scanner. Within the housing 34 there is an elongate window 36 defined by upper and lower edges 40, 41 and left and right sides 38, 39 through which the raster beam exits the scanner. As in a conventional scanner, the beam then impinges upon an indicia (not shown) to be captured. The light reflected from the light and dark areas of the indicia comes back through the window 36, is reflected by the mirror 22 on to a collecting mirror 42, and from there the light is directed to a photo detector 44. The output of the photo detector is a series of electrical pulses, representative of the light and dark areas of the indicia being scanned. These signals are sent to a decoder 45 (for example a microprocessor) which uses them to decode or read the indicia.

To provide Y-axis locating and timing information, in the event that the indicia to be captured does not include synchronisation code symbols, the embodiment of FIGS. 1 and 2 envisages preamble and postamble locating/timing/synchronisation means 46, 48. In the embodiment of FIGS. 1 and 2, these comprise active CCD's (charge coupled devices) which act as Y position sensors. When a particular scan line sweeps over the CCD 46, 48 a signal is produced which provides information on the Y-axis position of that particular scan line.

In FIG. 2, it will be seen that the CCD's 46, 48 are positioned within the housing 34, in front of the inner surface 32. It will of course be understood that the exact position is not important, provided that they are located within the sweep area of the scanning beam, and that they extend in the Y-axis direction. The CCD's could for example be positioned much closer to the mirror 22, or alternatively immediately adjacent to the inner surface 32 of the housing. They could even be positioned outside the window 36, provided of course that they remained within the line of sight of the beam. Signals from the CCD's 46, 48 are sent to the decoder 45; these signals along with the pulses representative of the reflected light that are received from the photo detector 44 enable the indicia to be decoded.

Other position-indicating devices could be used instead of CCD's, for example, a series of individual light detectors spaced in the Y-axis direction.

Figure 5:
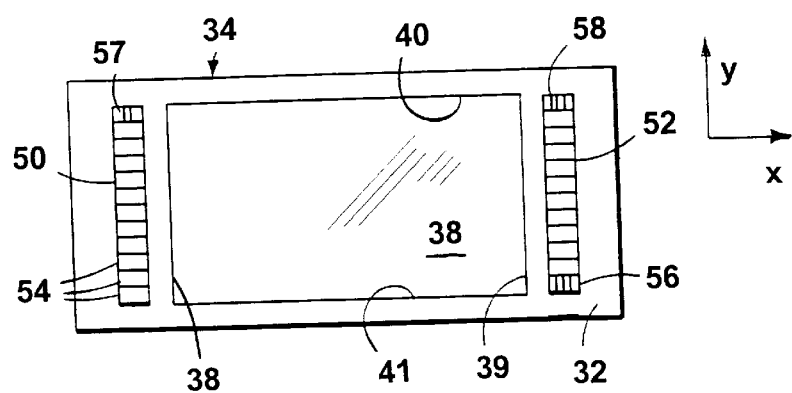
FIG. 5 shows an alternative version to that of Figure X, incorporating a passive position indicator.

In a further embodiment, shown in FIG. 5, the active CCD's are replaced by passive locating/timing/synchronisation means 50, 52. In the embodiment shown, the means 50, 52 comprise preamble and postamble code symbol structures which are pasted or otherwise secured to the inner surface 32 of the scanner housing 34 on opposite sides of the window 38. As the raster scan proceeds, the scanning path takes in the code symbol structure 50 before moving on to cover the indicia to be collected, via the window 38. The light then passes over the code symbol structure 52. Reflected light both from the indicia and from the code symbol structures 50, 52 is received by the photo detector 44 (FIG. 2). Y-positioning information is provided by virtue of the fact that the code symbol structures 50, 52 are split up into series of rows 54. Each row comprises a bar code symbol in its own right, one of which is schematically indicated at 56. Each individual bar code 56 is unique, and provides the scanner with information on the Y-axis position. For example, if the encoded signal received by the photo detector 44 indicates that the light beam has first passed over the unique bar code symbol 57, then across a part of the indicia, and finally across the second unique bar code symbol 58, that fixes the Y-axis position as being adjacent to the upper edge 40 of the window. As the raster scan gradually moves down across the window, the preamble and postamble information changes at each row, so giving a precise indication at all times of the Y-axis position of the beam.

Figure 4:
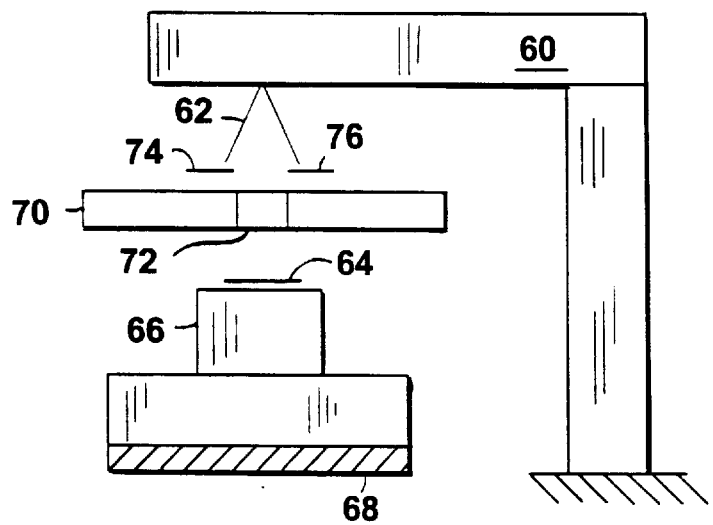
FIG. 4 shows yet another embodiment in which the beam position indicating means is separate from the housing of the scanner.

As previously mentioned, it s not essential for the locating/timing/synchronisation means to be within or part of the scanner housing. FIG. 4 shows an alternative arrangement in which a fixed scanner 60 uses a scanning beam 62 to capture an indicia 64 on a product 66 which is being moved past the scanner on a conveyer belt 68. Interposed between the scanner 60 and the product 66 is a mask 70 having a window 72. Adjacent to the window, and within the area scanned by the beam 62, are first and second locating/timing/synchronisation code symbol structures 74, 76. These code symbol structures are position on opposite sides of the window 72, as has been previously described with reference to FIG. 5. Alternatively, the structures 74, 76 may represent first and second CCD's corresponding to the CCD's 46, 48 of FIGS. 1 and 2. Depending upon the size of the indicia 64 to be captured, the mask 70 can be moved upwardly or downwardly, so that as seen from the scanner the indicia always appears to take up most of the area of the window.

Figure 3:
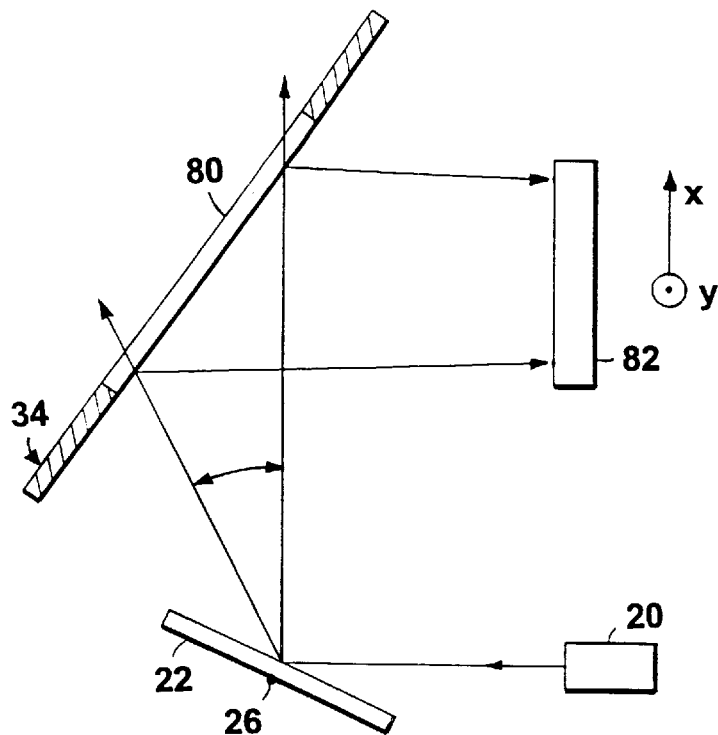
FIG. 3 shows a further embodiment.

The concept may be extended to determining the X-axis position instead of or in addition to the Y-axis position, as is illustrated in the alternative embodiment of FIG. 3. In this embodiment, the window comprises a half-silvered mirror or beam splitter 80. Light from the laser 20 first impinges upon the oscillating mirror 22 and then upon the partially silvered mirror 80. Part of the light passes through to impinge upon the indicia (not shown), while the rest is reflected back inside the housing 34 where it impinges upon an X-axis position indicator 82. This may either be an active position indicator, such as a CCD, or a passive indicator such as the series of stacked bar code symbols illustrated in FIG. 5.

If the position indicator 82 extends in the Y direction as well as in the X direction, complete positional information can be derived about the instantaneous (X,Y) position of the beam.

In the embodiment of FIG. 7, a light beam from a laser source (not shown) is reflected off of an oscillating mirror 110 to produce a scanning light beam generally indicated at 112. The mirror 110 oscillates about an axis 114, perpendicular with the page, so that the light beam repeatedly traces out a scan line 116 which for convenience is shown as dashed in the drawing.

The scan line 116 repeatedly traces out a path on the inside surface 118 of the housing of the scanner. Within the surface 118 there is an elongate window 120 defined by upper and lower edges 122, 124 and left and right sides 126, 128, through which the beam exits the scanner. As in a conventional scanner, the beam then impinges upon an indicia 134 to be captured. The light reflected from the light and dark areas of the indicia then come back to the scanner and are detected by a photosensor in the conventional way.

To provide locating and timing information, in the event that the indicia to be captured does not include synchronisation code symbols, the embodiment of FIG. 7 envisages preamble and postamble locating/timing/synchronisation code symbol structures 130, 132 being pasted or otherwise secured to the inner surface 118 of the scanner adjacent the ends 126, 128 of the window 120. As the mirror 110 oscillates about the axis 1141, the beam 112 scans first across the preamble code symbol structure 130, then across the indicia to be captured (via the window 120), then across the postamble code symbol structure 132. These code symbol structures may typically be a quarter of an inch wide (6 mm). Light from the entire length of the scan is reflected back and is received by the photodetector, which provides a signal to computing means (not shown) so enabling the scanner to capture and/or decode the indicia making use of the locating/time/synchronisation information which is provided by the preamble and postamble code symbol structures.

Figure 8:
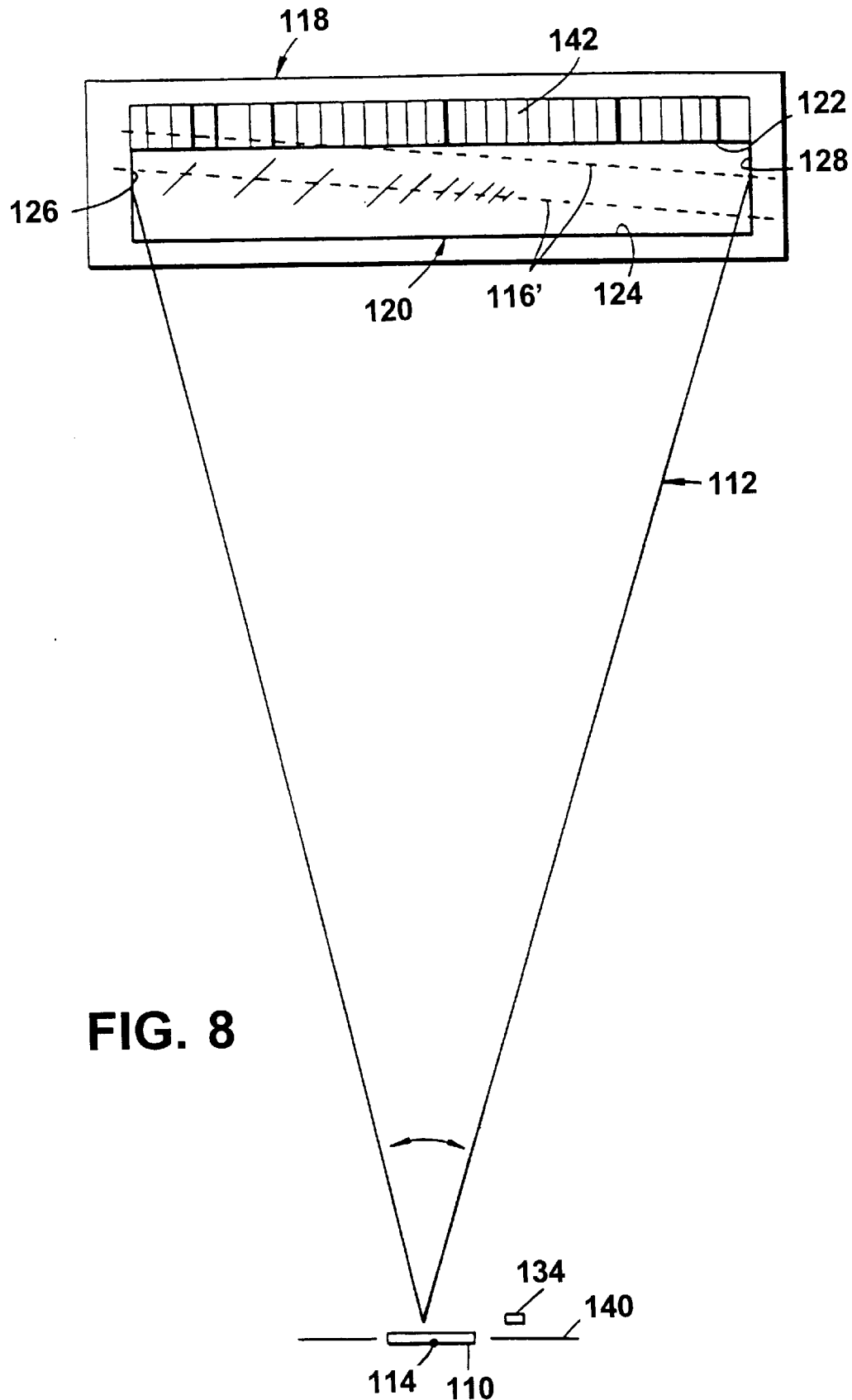
FIG. 8 is a further schematic drawing of the inside of a bar code reader, according to another embodiment of the invention.

Another embodiment of the invention is shown schematically in FIG. 8. Features which correspond to those already described with reference to FIG. 7 have the same reference numeral.

In this embodiment, the mirror 110 oscillates not only about the axis 114 but about an orthogonal axis 140, so that the scanning path 116' becomes a raster, as is indicated by the parallel dotted line.

Locating/synchronisation/timing information is provided by an upper code symbol structure 142 which is pasted or otherwise secured to the inner surface 118 of the scanner housing immediately above the window 120. As the raster scan proceeds, the scanning path takes in the code symbol structure 142 before moving on to cover the indicia to be collected, via the window 120. Reflected light from both the timing code symbol structure 142 and the indicia is received by the photodetector 134. The locating/synchronisation/timing information provided by the code symbol structure 142 enables the pulses of light received from the indicia to be properly calibrated and converted into a digital spatial representation of the indicia, held in memory.

Figure 9:
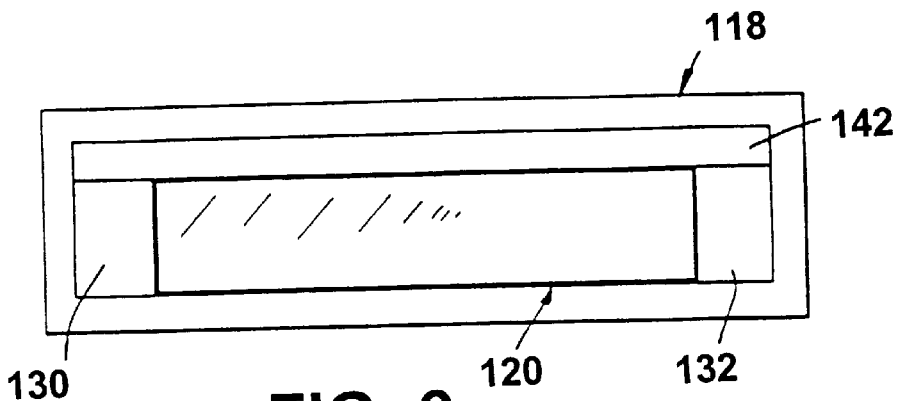
FIG. 9 shows an alternative arrangement of codes.

In a further embodiment, shown in FIG. 9, the upper code 142, is used in conjunction with the preamble and postamble code symbol structures 130, 132 of FIG. 7.

Figure 10:
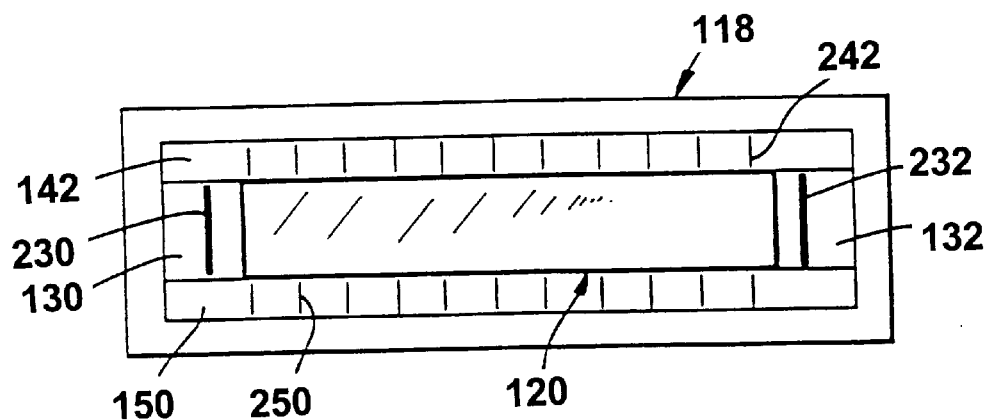
FIG. 10 shows yet another arrangement of codes.

In yet a further embodiment, shown in FIG. 10, a lower locating/timing/synchronisation code symbol structure 150 is used along with the upper code symbol structure 142 and the preamble and postamble code symbol structures 130, 132.

FIG. 10 shows more clearly a specific preferred embodiment for the upper and lower locating/timing/ synchronisation code symbol structures, and the preamble and postamble code symbol structures. As may be seen in the Figure, the upper and lower locating/timing/synchronisation code symbol structures 142, 150 comprise respective upper and lower speed compensation gratings 242, 250, each of which consisting of a series of equally spaced timing bars. The preamble and postamble code symbol structures comprise respective guard bars 230, 232. In use, the laser beam scans both above and below and to the left and right of the scanning window. The speed compensation gratings act to provide timing information, and thus provide information on the speed profile of the scanning laser beam. The waveform corresponding to each scan across the window contains two valleys which indicate the position of the guide bars. These valleys are present on all of the scan lines that cross the scanning window, and may be used to align adjacent scan lines.

Figure 11:
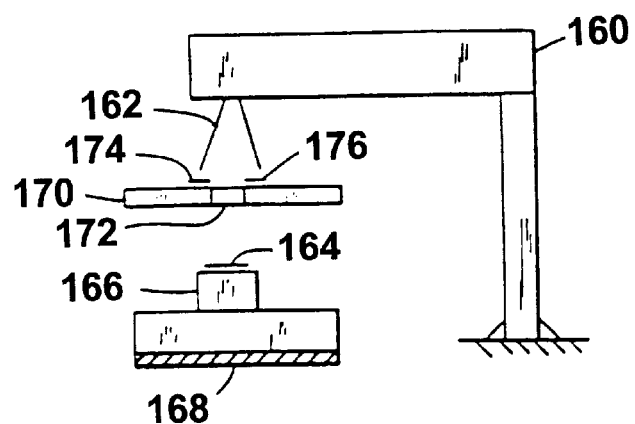
FIG. 11 shows another embodiment in which the masking means is separate from the housing of the scanner.

It will of course be appreciated that the guide bars and speed compensation gratings shown in FIG. 10 are equally applicable to other embodiments, including the alternative arrangement shown in FIG. 11.

In any of the embodiments of FIGS. 7–11, the locating/timing/synchronisation code symbol structures are preferably printed onto strips of paper which are then pasted or otherwise glued to the inner surface 118 of the scanner body, adjacent to the window 120. However, it is also envisaged that the code symbol structures could be directly printed onto the surface 118. It is of course not necessary for the code symbol structures to be exactly co-planar with the window 120, provided that they are so positioned as to be read by the scanning light beam. Accordingly, instead of the preamble and postamble code symbol structures 130, 132 being pasted immediately adjacent the window they could instead be positioned on some other part 160 of the scanter housing, as is shown in FIG. 7, provided that that part sufficiently projects into the scanning area of the beam so that the code symbol structures will be read. The upper and/or lower core symbol structures 142, 150 could likewise be positioned on some other part of the housing (not shown) which is so positoned as to be illuminated by the raster beam. In a further development of the invention, it is not even necessary for the locating/timing/synchronisation code symbol structures to be contained within the housing of the scanner. FIG. 11 shows an arrangement in which a fixed scanner 160 uses a scanning beam 162 to capture an indicia 164 on a product 166 which is being moved past the scanner on a conveyor belt 168. Interposed between the scanner 160 and the product 166 is a mask 170 having a window 172. Adjacent the window, and within the area scanned by the beam 162, are first and second locating/timing/synchronisation code symbol structures 174, 176. These code symbol structures could be positioned either on two, three or four sides of the window 172 as has already previously been described with reference to FIGS. 7 to 11. Depending upon the size of the indicia 164 to be captured, the mask 170 can be moved upwardly or downwardly, so that as seen from the scanner the indicia always appears to take up most of the area of the window.

In all of the embodiments, the indicia to be captured can be any of various types of images, including, e.g., matrix code symbols, signatures, logos, or scenes. Because the invention can accurately determine the instantaneous XY position of the outgoing laser beam, it is possible to use the invention in the construction of a scanner for digitizing images of any nature, including text as well as graphic images.

It will be understood that each of the elements described above, or two or more together, may find a useful application in other types of construction differing from the types described above.

The beam 10 is preferably a scanning laser beam, although other types of raster scanning beam also fall within the ambit of the invention.

The beam 112 is preferably a scanning laser beam, although other types of scanning beam also fall within the ambit of the invention. The invention also encompasses the use of a CCD imager. With such an arrangement the structures 130, 132 in FIG. 7 become CCD imagers rather than code symbol structures. When light falls upon the CCD imagers 130, 132 they provide electrical signals (not shown) which provide an indication of exactly when the light beam reaches each of the imagers. Likewise, in FIG. 8 the upper structure 142 could be a CCD imager.

While the invention has been illustrated and described with reference to various particular embodiments, it is not intended to be limited to any of the details shown, since various modifications and structural changes may be made without departing in any way from the spirit of the present invention.

What is claimed is:

1. An optical scanner for scanning an object having areas of different light reflectivity, the scanner comprising:
    an optical source constructed and positioned to produce an outgoing light beam that moves in a path along a two-dimensional raster scan pattern over the object, wherein the raster scan pattern includes a scanning direction and a direction generally orthogonal to the scanning direction;
    an optical detector constructed and positioned to receive light reflected from the object and to produce a signal representative of reflectivity differences of the object along the path of the light beam; and
    at least one beam position sensor in the path of the outgoing light beam, the sensor being constructed and positioned to provide an output indicative of the location of the beam along the generally orthogonal direction of the raster scan pattern.

2. The subject matter of claim 1 further comprising a decoder supplied with the output of the optical detector and the output of the beam position sensor.

3. A method for optically scanning an object having areas of different light reflectivity, the method comprising the steps of:
    using an optical source to scan a light beam across the object in path along a two-dimensional raster scan pattern, wherein the raster scan pattern includes a scanning direction and a direction generally orthogonal to the scanning direction;
    using an optical detector to detect light reflected from the object and to produce a signal representative of reflectivity differences of the object along the path of the light beam; and
    positioning at least one beam detection sensor in the path of the outgoing light beam to provide an output indicative of the location of the beam along the generally orthogonal direction of the raster scan pattern.

4. The subject matter of claim 3 further comprising the step of decoding, based at least in part on the output of the optical detector and the output of the beam position sensor.

5. The subject matter of claim 1 or 3 wherein the two dimensional pattern is a two-dimensional raster pattern.

6. The subject matter of claim 5 wherein the light beam is scanned rapidly back and forth along the scanning direction, and more slowly back and forth along the generally orthogonal direction.

7. The subject matter of claim 6 wherein the beam position sensor further provides an output indicative of the location of the beam along the scanning direction.

8. The subject matter of claim 1 or 3 wherein the optical source, optical detector, and beam position sensor are installed in a housing.

9. The subject matter of claim 8 wherein the outgoing light beam passes through a window in the housing; the beam position sensor is located adjacent to a portion of the periphery of the window; and the beam position sensor is configured to detect the position of the beam along that portion of the periphery of the window.

10. The subject matter of claim 9 wherein the window is generally rectangular and is defined by an upper edge, a lower edge, a first side edge and a second side edge, the beam scanning across the window from the first side edge to the second side edge, and the beam position indicating means comprising a first portion adjacent the first side edge and a second portion adjacent the second side edge.

11. The subject matter of claim 8 wherein said housing is configured as a hand-held bar code reader.

12. The subject matter of claim 1 or 3 wherein the output of the beam position sensor varies according to the position of the outgoing light beam when it impinges on the sensor.

13. The subject matter of claim 12 wherein the beam position sensor is divided into a plurality of sections and the output of the sensor varies according to which section is impinged on by the outgoing light beam.

14. The subject matter of claim 12 wherein the output of the beam position sensor is an electrical signal.

15. The subject matter of claim 1 or 3 wherein the optical source and optical detector are installed in a housing, and the beam position sensor is located intermediate the housing and the object.

16. The subject matter of claim 1 or 3 wherein a beam splitter splits the outgoing light beam into two beam portions, a first beam portion that is arranged to impinge upon the object, and a second beam portion that is arranged to impinge upon the beam position sensor.

17. The subject matter of claim 16 wherein the beam position sensor is configured to locate the position of the outgoing light beam in the two scanning dimensions.

18. The subject matter of claim 1 or 3 wherein the object comprises an indicia.

19. The subject matter of claim 18 wherein the object comprises at least one of following: a two-dimensional bar code symbol, a signature, a logo.

20. The optical scanner of claim 1 wherein the beam position sensor comprises a CCD.

21. An optical scanner for optically scanning an object having areas of different light reflectivity, the scanner comprising:

an optical source including means for scanning a light beam across the object in a path along a two-dimensional raster scan pattern, wherein the raster scan pattern includes a scanning direction and a direction generally orthogonal to the scanning direction;

an optical detector including means for detecting light reflected from the object and producing a signal representative of reflectivity differences of the object along the path of the light beam; and at least one beam detection sensor in the path of the outgoing light beam, said sensor including means for providing an output indicative of the location of the beam along the generally orthogonal direction of the raster scan pattern.

22. An optical scanner for scanning an object having areas of different light reflectivity, the scanner comprising:

an optical source constructed and positioned to produce an outgoing light beam that moves in a two-dimensional raster scan pattern over the object, wherein the raster scan pattern includes a scanning direction and a direction generally orthogonal to the scanning direction;

an optical detector constructed and positioned to receive light reflected from the object and to produce a signal representative of reflectivity differences of the object along the path of the light beam; and a plurality of different bar code symbols in the path of the outgoing light beam, each positioned between the optical source and the object at a different location along at least the generally orthogonal direction of the raster scan pattern, the bar code symbol being configured to provide an output indicative of the location of the beam along the generally orthogonal direction of the raster scan pattern.

23. The optical scanner of claim 22 wherein the object comprises a bar code symbol.

24. The optical scanner of claim 22 wherein the object comprises an indicia.

25. The optical scanner of claim 22 wherein the plurality of different bar code symbols positioned between the object and the optical source comprise a first bar code symbol that is scanned by one or more raster lines before subsequent raster lines scan across the object.

26. The optical scanner of claim 25 wherein the plurality of different bar code symbols positioned between the object and the optical source further comprise a second bar code symbol that is scanned by one or more raster lines after prior raster lines scan across the object.

27. The optical scanner of claim 26 wherein the plurality of different bar code symbols positioned between the object and the optical source further comprise third bar code symbols positioned along the scan direction to one or both sides of the object.

28. The optical scanner of claim 27 wherein the optical scanner comprises a housing with a window in the housing through which the outgoing light beam passes to reach the object, and wherein the first, second, and third bar code symbols are positioned on an interior surface of the housing surrounding the window.

29. The optical scanner of claim 28 wherein the window is generally rectangular and is defined by an upper edge, a lower edge, a first side edge and a second side edge, the beam scanning across the window from the first side edge to the second side edge, and the third bar code symbols are positioned adjacent at least the first side edge.

30. The optical scanner of claim 28 wherein the window is generally rectangular and is defined by an upper edge, a lower edge, a first side edge and a second side edge, the beam scanning in a raster fashion in series of generally parallel lines, the first and second bar code symbols being positioned adjacent the lower and upper edges of the window.

31. The optical scanner of claim 25 wherein the first bar code symbol comprises a speed compensation grating.

32. The optical scanner of claim 22 wherein the plurality of different bar code symbols positioned between the object and the optical source comprise third bar code symbols positioned along the scan direction to one or both sides of the object.

33. The optical scanner of claim 32 wherein the third bar code symbols comprise guard bars.

* * * * *

UNITED STATES PATENT AND TRADEMARK OFFICE
CERTIFICATE OF CORRECTION

PATENT NO.     : 5959286
DATED          : SEPTEMBER 28, 1999
INVENTOR(S)    : PAUL DVORKIS, JIM LI, AND EUGENE JOSEPH

It is certified that error appears in the above-identified patent and that said Letters Patent is hereby corrected as shown below:

Column 2, line 19, "tying" should be --trying--.

Column 2, line 34, "reliable" should be --reliably--.

Column 6, line 24, "1141" should be --141--.

Column 7, line 6, "consisting" should be --consists--.

Column 7, line 32, "scanter" should be --scanner--.

Column 7, line 36, "core" should be --code--.

Column 10, line 3, "pat tern" should be --pattern--.

Signed and Sealed this

First Day of May, 2001

*Attest:*

NICHOLAS P. GODICI

*Attesting Officer*    *Acting Director of the United States Patent and Trademark Office*